(12) United States Patent
Rice et al.

(10) Patent No.: US 10,607,046 B2
(45) Date of Patent: Mar. 31, 2020

(54) SYSTEMS AND METHODS FOR AUTHENTICATING A CARTRIDGE

(71) Applicant: Multipure International, Las Vegas, NV (US)

(72) Inventors: Zachary Rice, Las Vegas, NV (US); Brett Britton, Las Vegas, NV (US); Kyle Muranyi, Las Vegas, NV (US)

(73) Assignee: MULTIPURE INTERNATIONAL, Las Vegas, NV (US)

( * ) Notice: Subject to any disclaimer, the term of this patent is extended or adjusted under 35 U.S.C. 154(b) by 0 days.

(21) Appl. No.: 15/883,255

(22) Filed: Jan. 30, 2018

(65) Prior Publication Data

US 2018/0232974 A1 Aug. 16, 2018

Related U.S. Application Data

(63) Continuation of application No. 15/431,951, filed on Feb. 14, 2017, now Pat. No. 9,922,474.

(51) Int. Cl.
*G06K 7/10* (2006.01)
*H04W 12/06* (2009.01)
*G06K 19/07* (2006.01)
*G06K 19/073* (2006.01)

(52) U.S. Cl.
CPC ....... *G06K 7/10366* (2013.01); *G06K 19/073* (2013.01); *G06K 19/0723* (2013.01); *H04W 12/06* (2013.01)

(58) Field of Classification Search
CPC ... B41J 2/17543; B41J 2/17546; G06F 21/44; G06F 21/445; H04W 12/06

USPC ..................................... 340/5.6, 5.86, 10.42
See application file for complete search history.

(56) References Cited

U.S. PATENT DOCUMENTS

| 2004/0223011 | A1 | 11/2004 | Adkins et al. |
| 2004/0257203 | A1 | 12/2004 | Maltsev et al. |
| 2010/0135679 | A1 | 6/2010 | Lapstun et al. |
| 2010/0289627 | A1 | 11/2010 | McAllister et al. |
| 2012/0134686 | A1 | 5/2012 | Jones et al. |
| 2013/0070279 | A1 | 3/2013 | Misumi |
| 2013/0290360 | A1 | 10/2013 | Cunningham et al. |
| 2014/0093258 | A1 | 4/2014 | Thacker et al. |
| 2017/0050130 | A1* | 2/2017 | Bippus .................. F25D 23/126 |

(Continued)

OTHER PUBLICATIONS

International Search Report for International Patent Application No. PCT/US2017/017796, dated Apr. 24, 2017.

(Continued)

*Primary Examiner* — Kevin Kim
(74) *Attorney, Agent, or Firm* — Greenberg Traurig, LLP (57) ABSTRACT

System and methods for authenticating a cartridge comprising reading a unique identifier (UID) and a unique authentication string (UAS) stored on a data storage medium associated with a cartridge; generating, based on the UID or the UAS read from the data storage medium, a test unique authentication string (TUAS) or a test unique identifier (TUID), respectively, according to a methodology used to generate the UAS stored on the data storage medium; and comparing the TUAS or the TUID to the UAS or the UID read from the data storage medium, respectively, to determine if the cartridge is authentic. A method in which the UAS is generated and stored on the data storage medium at a first location, and subsequently authenticated at a second location.

14 Claims, 6 Drawing Sheets

(56) References Cited

U.S. PATENT DOCUMENTS

2017/0225476 A1    8/2017  Ness et al.
2018/0065068 A1*  3/2018  Lee ...................... B01D 35/308
2018/0154292 A1*  6/2018  Zhong .................. B01D 35/143

OTHER PUBLICATIONS

U.S. Appl. No. 15/431,951, filed Feb. 14, 2017, Systems and Methods for Authenticating a Cartridge.

* cited by examiner

SYSTEMS AND METHODS FOR AUTHENTICATING A CARTRIDGE

RELATED APPLICATIONS

This application is a continuation patent application of U.S. application Ser. No. 15/431,951 filed Feb. 14, 2017, which is incorporated herein by reference in its entirety.

FIELD

The presently disclosed embodiments relate to authentication of cartridges used in various devices such as filtration systems, beverage brewing machines, computer printers, and the like.

BACKGROUND

Existing solutions for preventing the use of unauthorized cartridges in various devices suffer from a number of disadvantages. Solutions that compare an identification of an inserted cartridge with a database of authentic identifications often require the device to store said database on the device or to be in remote communication with said databases. This can increase the cost and complexity of such systems, including difficulties in keeping these databases up to date. Other solutions rely upon some sort of generic identifier on the cartridge that indicates the cartridge was produced by an authorized party. Such generic identifiers can be easy to decipher and overcome such that unauthorized parties may produce and sell unauthentic cartridges that work with the device.

Therefore, there is a need for improved systems and methods for authenticating a cartridge.

SUMMARY

The present disclosure is directed to a system for authenticating a cartridge, such as one containing a filtration media, printer ink, or media for flavoring, brewing or otherwise creating a beverage. The system may comprise a reader (e.g., an RFID reader) configured to read a unique identifier (UID) and a unique authentication string (UAS) stored on a data storage medium (e.g., and RFID tag) associated with a cartridge; a memory containing computer-readable instructions for generating, based on the UID or the UAS read from the data storage medium, a test unique authentication string (TUAS) or a test unique identifier (TUID), respectively, according to a methodology used to generate the UAS stored on the data storage medium; and a processor configured to: read the computer-readable instructions from the memory, generate the TUAS or the TUID according to the instructions, and compare the TUAS or the TUID to the UAS or the UID read from the data storage medium, respectively, to determine if the cartridge is authentic.

The UID, in an embodiment, may be a unique string of characters assigned to and stored on the data storage medium for differentiating the identity of the cartridge from that of other cartridges. The UAS, in an embodiment, may be a string of characters associated with the UID and representative of one or more manipulations of characters forming the UID. Portions of the UAS string of characters, in an embodiment, may be stored separately in predefined locations on the digital storage medium associated with the cartridge. Decoy characters, in an embodiment, may be generated and stored throughout otherwise unused portions of the data storage medium.

The methodology for generating the TUAS or the TUID may comprise one or a combination of rearranging, altering, dividing, supplementing, or otherwise manipulating the characters forming the UID or the UAS, respectively. The processor, in an embodiment, may determine that the cartridge is authentic if the TUAS or the TUID matches the UAS or the UID, respectively.

In another aspect, the present disclosure is directed to a method for authenticating a cartridge. The method comprises reading a unique identifier (UID) and a unique authentication string (UAS) stored on a data storage medium associated with a cartridge; generating, based on the UID or the UAS read from the data storage medium, a test unique authentication string (TUAS) or a test unique identifier (TUID), respectively, according to a methodology used to generate the UAS stored on the data storage medium; and comparing the TUAS or the TUID to the UAS or the UID read from the data storage medium, respectively, to determine if the cartridge is authentic. The UAS, in an embodiment, may comprise at least two strings of characters and each of the strings of characters may be stored in separate locations on a digital storage medium associated with the cartridge. Decoy characters, in an embodiment, may be generated and stored throughout otherwise unused portions of the data storage medium.

In yet another aspect, the present disclosure is directed to another method for authenticating a cartridge wherein the UAS may be generated and stored on the data storage medium at a first location, and subsequently authenticated at a second location. The first location, in an embodiment, may comprise a setting in which the cartridge or data storage medium is manufactured. The second location, in an embodiment, may comprise a setting in which the cartridge is inserted for use in a device by an end user, such as a water filtration system.

In particular, at the first location, the method may comprise generating a unique authentication string (UAS) based on a unique identifier (UID) associated with a cartridge; and storing portions of the string separately in predefined locations of a data storage medium associated with the cartridge. At the second location, the method may comprise reading the UAS and the UID on the data storage medium; generating, based on the UID or the UAS read from the data storage medium, a test unique authentication string (TUAS) or a test unique identifier (TUID), respectively, according to the methodology used to generate the UAS stored on the data storage medium; and comparing the TUAS or the TUID to the UAS or the UID read from the data storage medium, respectively, to determine if the cartridge is authentic.

DETAILED DESCRIPTION

Embodiments of the present disclosure include systems and methods for authenticating a wide variety of insertable cartridges used in various devices, such as cartridges containing media for filtering water and other fluids, printer ink, and consumables (e.g., powders, fluids, or other media for making coffee, tea, soft drinks, and other beverages), amongst others.

Within the scope of the present disclosure, the term "authenticating" (and derivatives thereof such as authentication, authentic, etc.) generally refers to determining whether a particular cartridge is approved for use in a particular device. In some aspects, approval may relate to whether the particular cartridge is compatible with the particular device—for example, whether the cartridge is of the correct size or type for the device to function properly and in an intended way. Additionally or alternatively, approval may relate to whether the particular cartridge has been manufactured, serviced, and/or filled with media by an authorized party. Such approval of a cartridge and its contents can be very important for ensure proper and safe functioning of the device, the quality of the resulting product, and avoiding damage to the device. For example, in the context of a water filter cartridge, the use of unapproved or substandard filtration media (or cartridges housing said media) in a water filtration system could potentially result in the production of unsafe or poor quality drinking water, as well as damage to the water filtration system such as, without limitation, mechanical damage resulting from excess pressure buildup in the filtration system and electrical damage resulting from overworking or failing to adequately cool pumps and other components.

In various embodiments of the present disclosure, authentication may occur locally—that is, the process of determining whether a particular cartridge is authentic is performed by the device without the need for retrieving or sending information to or from a remote server or database. Stated otherwise, the device, in such embodiments, does not require an internet or other form of remote communications connection to perform the authentication process. Instead, the cartridge and the device are provided with all necessary information and functionality in advance. In various other embodiments of the present disclosure, authentication may occur remotely—that is, the device may transmit information regarding the cartridge (and possibly information regarding the device itself) to a remotely-situated computing device that performs all or the majority of the authentication process and reports back as to whether the cartridge is authentic.

Figure 2:
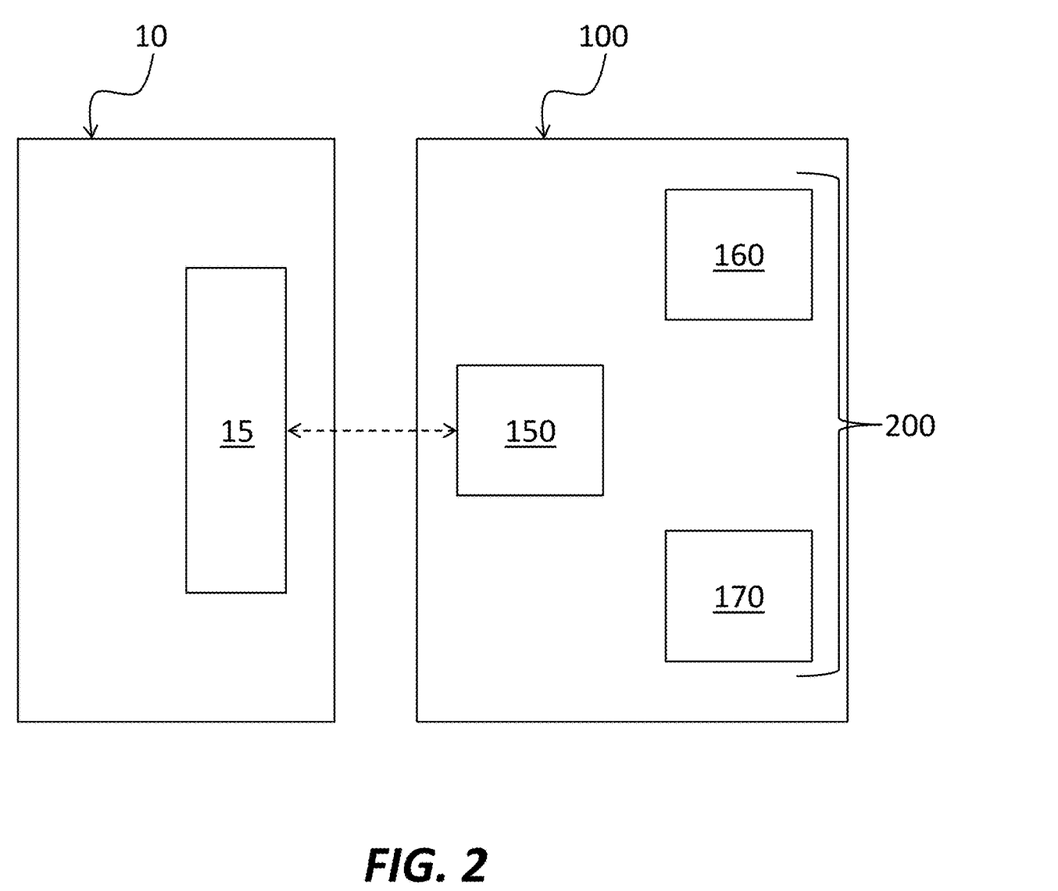
FIG. 2 schematically depicts an authentication system, according to an embodiment of the present disclosure.

Embodiments of the present disclosure provide novel approaches to authenticating a cartridge involving generating, identifying, and verifying a unique authentication string(s) stored on an RFID tag (or other data storage media) associated with a cartridge. For ease of explanation, such novel approaches will be described in the context of authenticating a representative cartridge 10 in a representative water filtration system 100 utilizing a representative authentication system 200, as described in more detail below. Of course, it should be recognized that the systems and methods for cartridge authentication described herein may be applied to any suitable device, and that the present disclosure is not intended to be limited to water filtration system 100 or water filtration generally, but rather may be applied to any suitable device and application.

Figure 1:
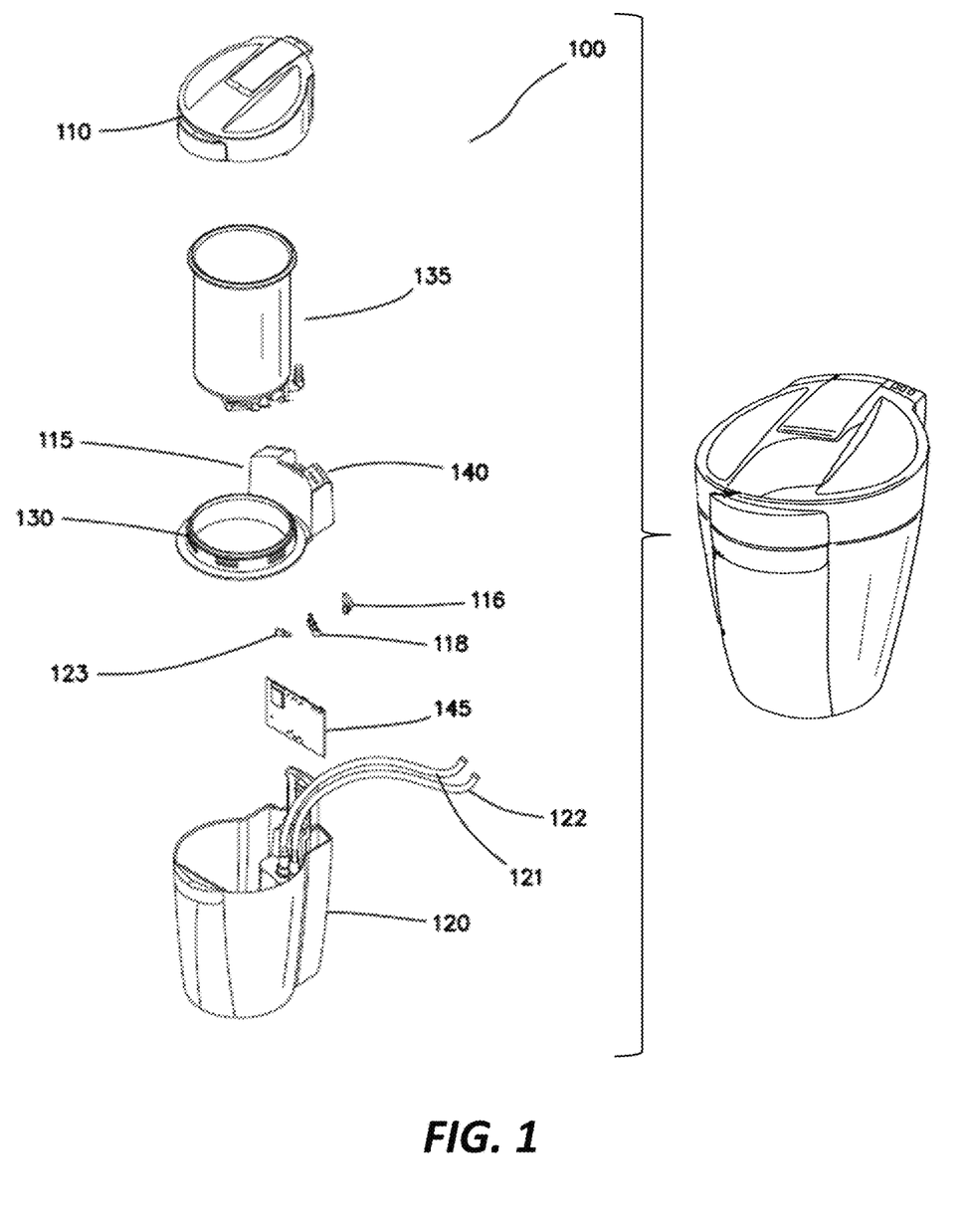
FIG. 1 depicts an exploded view of a representative water filtration system with which systems and methods of the present disclosure may be used to authenticate a filter cartridge, according to various embodiments of the present disclosure.

FIG. 1 shows a perspective and exploded view of a representative water filtration system 100 similar to that disclosed in U.S. patent application Ser. No. 14/458,218 to Rice, which is incorporated by reference herein in its entirety for all purposes.

The representative water filtration system 100 includes a lid assembly 110, housing assembly 120, ring enclosure 130, pressure vessel 135 for receiving cartridge 10 (later shown in FIG. 2), user interface 140, and printed circuit board 145. The housing assembly 120 and ring enclosure 130 can be a single, integral unit such that the lid assembly 110 attaches directly to the housing assembly 120. A source water line (inlet) 121 and filtered water line (outlet) 122 connect to the housing assembly 120 and serve to receive source water in need of filtration and dispense filtered water.

Printed circuit board 145 is positioned within an interface tower 115 integral with said ring enclosure 130 including control button 116 which may be used to (i) turn the water filtration system 100 on and off; (ii) check filter life; (iii) check gallons of water filtered, etc. The interface tower 115 may also incorporate a light pipe 118 for providing operational information regarding the water filtration system 100 and status/state thereof indicator lights of user interface 140. A USB plug 123 is integrated into said interface tower 115 providing means to manually download data from or to the water filtration system 100 as needed.

FIG. 2 illustrates a block diagram of authentication system 200. As shown, authentication system 200 may comprise elements of cartridge 10 and water filtration system 100. A reader 150 of water filtration system 100 may be configured for communication with a digital storage media 15 of cartridge 10. Reader 150 may include any suitable device for reading information from data storage media 15 included on, within, or otherwise associated with cartridge 10, such as an RFID tag. In a representative example, reader 150 may be an RFID reader configured to emit a radio signal for interrogating RFID-configured data storage media such as a passive or semi-passive RFID tag, as shown by the dashed line in FIG. 2. Of course, the present disclosure is not intended to be limited to RFID technology; instead, one of ordinary skill in the art will recognize that any suitable technology may be used so long as data storage media 15 is capable of storing authentication-related information and reader 150 is capable of reading said authentication-related information from data storage media 15.

The authentication process, in various embodiments, may be performed by a processor 160 and memory 170 of water filtration system 100. Processor 160 may be configured to carry out computer-readable instructions associated with the authentication process stored on memory 170, as well as to manage the reading, communication, and storage of information amongst various components of system 100. Memory 170 may be configured to store computer-readable instructions for authenticating cartridge 10, as well as other information associated with the operation of system 100.

Generating Unique Authentication String(s) 210

Figure 3:
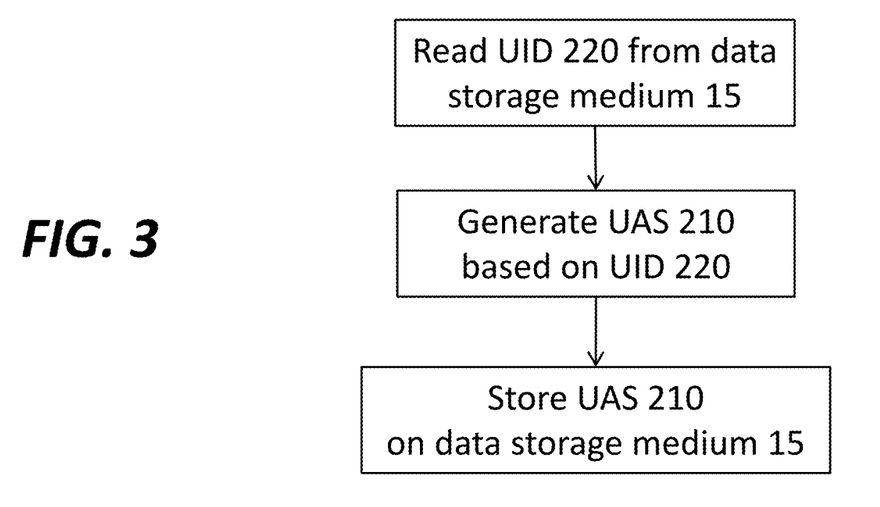
FIG. 3 is a flow chart depicting a method for generating and storing a unique authentication string (UAS) on a data storage medium associated with the cartridge, according to an embodiment of the present disclosure.

FIG. 3 illustrates a representative process for generating and storing a unique authentication string (UAS) 210 on data storage medium 15 of cartridge 10. This process, in various embodiments, may be performed by a manufacturer of cartridge 10 or any other authorized party, and typically occurs prior to distribution of cartridge 10 to authorized sellers and end users of water filtration system 100. In this way, cartridge 10 can be read and authenticated upon being inserted into and used by water filtration system 100.

UAS 210, in various embodiments, may be based upon a unique identifier (UID) 220 already stored on cartridge 10, as shown in FIG. 3. Typically, but without limitation, UID 220 is a unique string of characters assigned to and stored on the data storage medium 15 (e.g., RFID tag) of each cartridge 10 that can be read to differentiate cartridges 10 from one another, much like unique bar codes. In the embodiment shown, UID 220 can be read from data storage medium 15 and processed according to a predefined set of rules or algorithm to generate UAS 210 based on UID 220, as described in more detail below with reference to FIG. 4.

Figure 4:
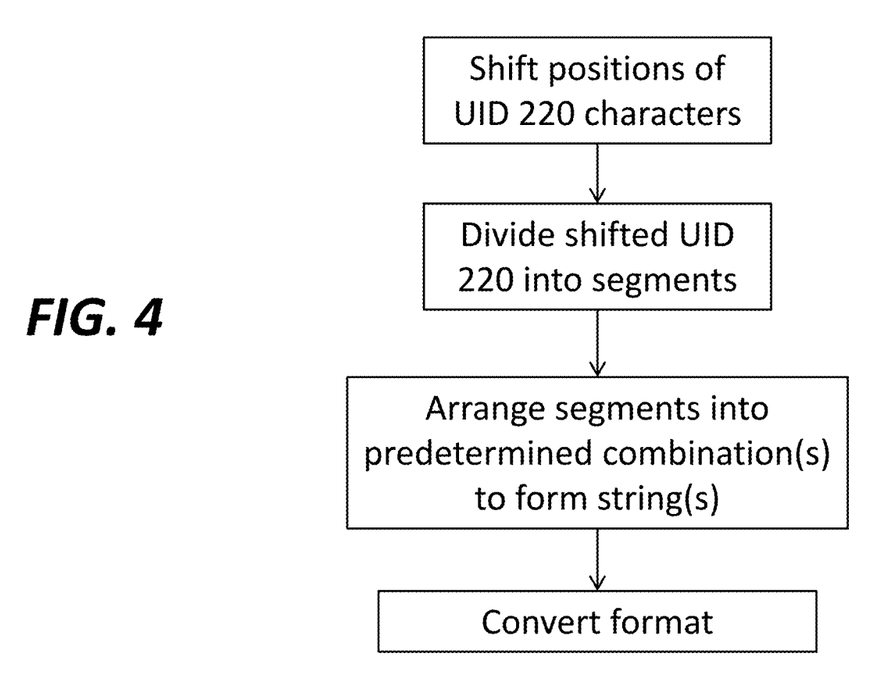
FIG. 4 is a flow chart depicting a method for generating the UAS based on a unique identification (UID) associated with the cartridge, according to an embodiment of the present disclosure.

FIG. 4 illustrates a representative process for generating UAS 210 based on UID 220 of cartridge 10. Generally speaking, the characters of UID may be rearranged, altered, divided, supplemented, or otherwise manipulated according to any suitable set of rules or algorithm to generate UAS 210. For example, the representative process of FIG. 4 illustrates a process for generating UAS 210 in which the characters comprising UID 220 are first shifted, then divided into segments, those segments then arranged into predetermined combinations to form various strings, and then those strings converted to cipher HEX format, as further detailed below:

Step 1) Request UID from data storage medium
1E5D6F68
Step 2) Shift UID characters three spaces to the left
D6F681E5
Step 3) Split UID in half
D6F6←Half 1
81E5←Half 2
Step 4) Create strings from halves in various predefined combinations
D6F681E581E5D6F6←Half 1, Half 2, Half 2, Half 1
81E581E5D6F6D6F6←Half 2, Half 2, Half 1, Half 1
D6F6D6F6D6F681E5←Half 1, Half 1, Half 1, Half 2
Step 5) Convert format of strings to cipher HEX
227020707879267678792676227027070←UAS 210a
787926767879267622702070227027070←UAS 210b
227020702270207022702707078792676←UAS 210c As configured, UAS 210 comprises the resulting cipher HEX strings UAS 210a, UAS 210b, UAS 210c shown under step 5 above. These strings may then be stored in combination with UID 220 on data storage medium 15, as described in more detail below with reference to FIGS. 5A-5C.

It is important to note that while any suitable process may be used to generate UAS 210 from UID 220, there may be benefits to certain approaches described herein.

Second, by sufficiently manipulating the characters of UID 220 when generating UAS 210 as in steps 1-5 above, it can be made more difficult to reverse engineer the particular process used to generate UAS 210. This, in turn, can make it more difficult for unauthorized third parties to produce and sell unauthentic cartridges, or to develop countermeasures for overcoming the authentication process such that unauthentic cartridges may be used in water filtration system 100. Similar benefits may be derived from certain approaches for storing UAS 210 on cartridge 10 in a non-descript manner, as further detailed below with reference to FIGS. 5A and 5B.

The above-referenced processes for generating UAS 210 may be performed using any suitable hardware and software programs known in the art. For example, any suitable commercial RFID reader may be used to read UID 220 from data storage medium 15, and any suitable computer and computer software may be used to implement the methodology used to generate UAS 210 based on UID 220 in accordance with the present disclosure.

Storing Unique Authentication String(s) 210

Figure 5:
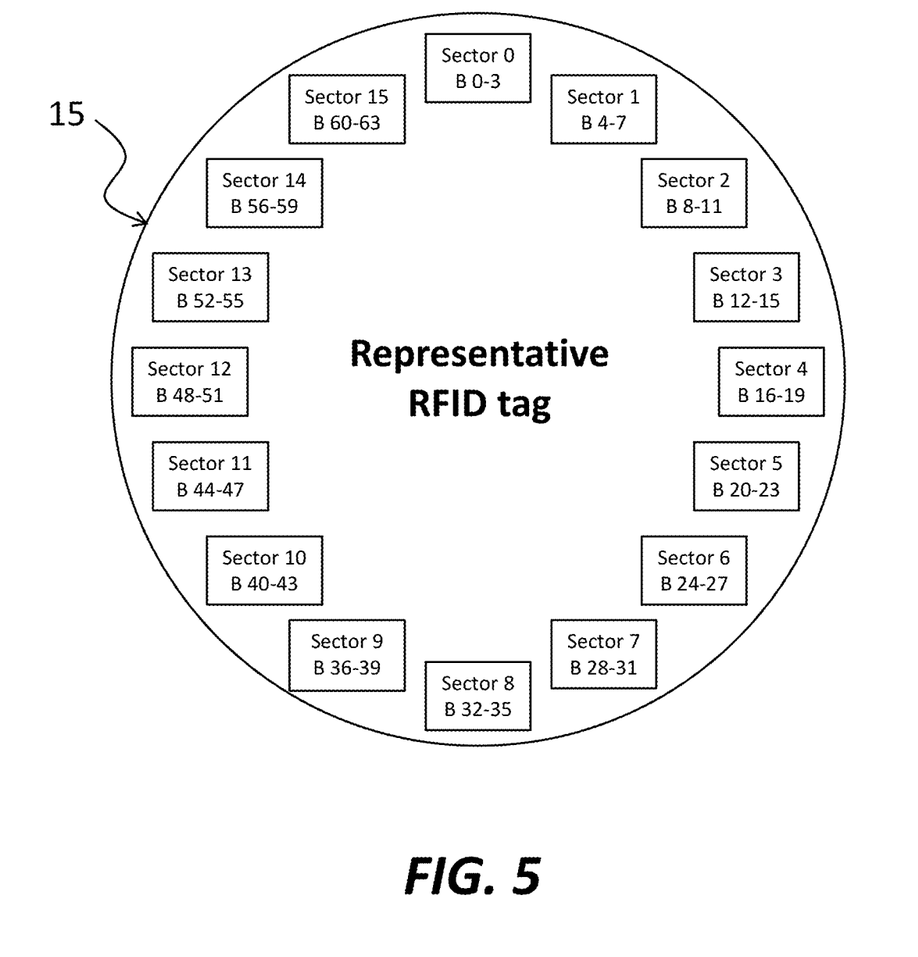
FIG. 5 schematically depicts a data storage medium, according to an embodiment of the present disclosure.

FIG. 5 schematically depicts the architecture of a representative data storage medium 15 associated with cartridge 10. In the embodiment shown, representative data storage medium 15 is a MIFARE® RFID tag configured with 1024 bytes of read-only memory (e.g., EEPROM) in 16 sectors divided amongst 4 blocks of 64 bytes each. Access bits and a key may be provided and stored in any suitable location for accessing data included in each sector. For example, in the representative RFID tag architecture, access bits and a key may be stored in one of the four blocks allocated to each sector. In one such embodiment, access bits and a key are stored in the final block of each sector (e.g., in blocks 3, 7, 11 of sectors 0, 1, 2 and so on) as later shown in FIG. 6B. Similarly, UID 220 may be stored in any suitable location on data storage medium 15 such as in block 1 of sector 0 as later shown in FIG. 6B as well. It should be recognized that this particular embodiment of data storage medium 15 and the manner in which UID 220, access bits, and keys are stored is merely illustrative, and that data storage medium 15 and its data allocations are not intended to be limited to this particular configuration.

Figure 6A:
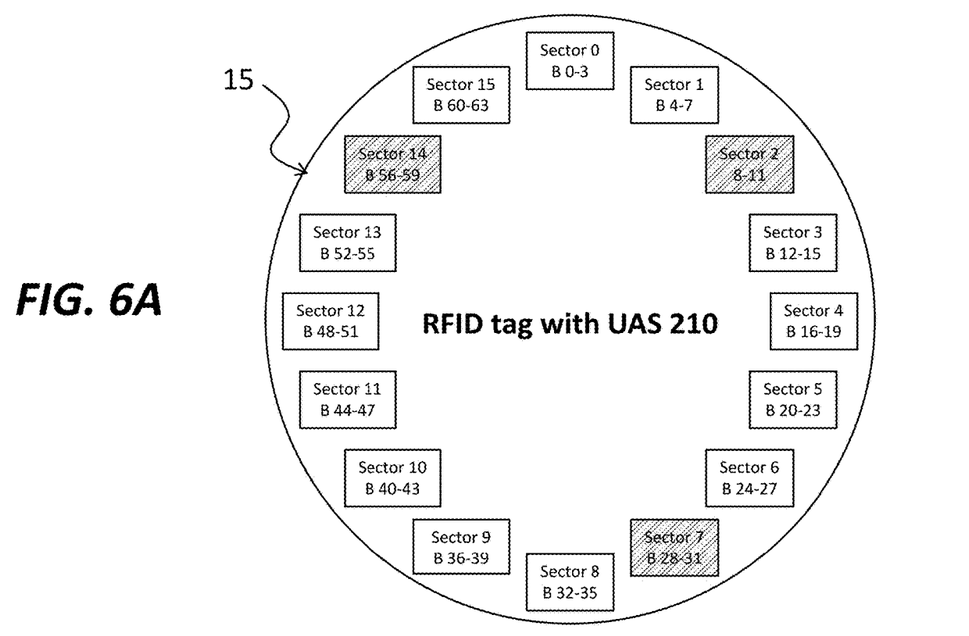
FIG. 6A schematically depicts a representative approach for storing portions of a UAS in various sectors of the data storage medium of FIG. 5, according to an embodiment of the present disclosure.
Figure 6B:
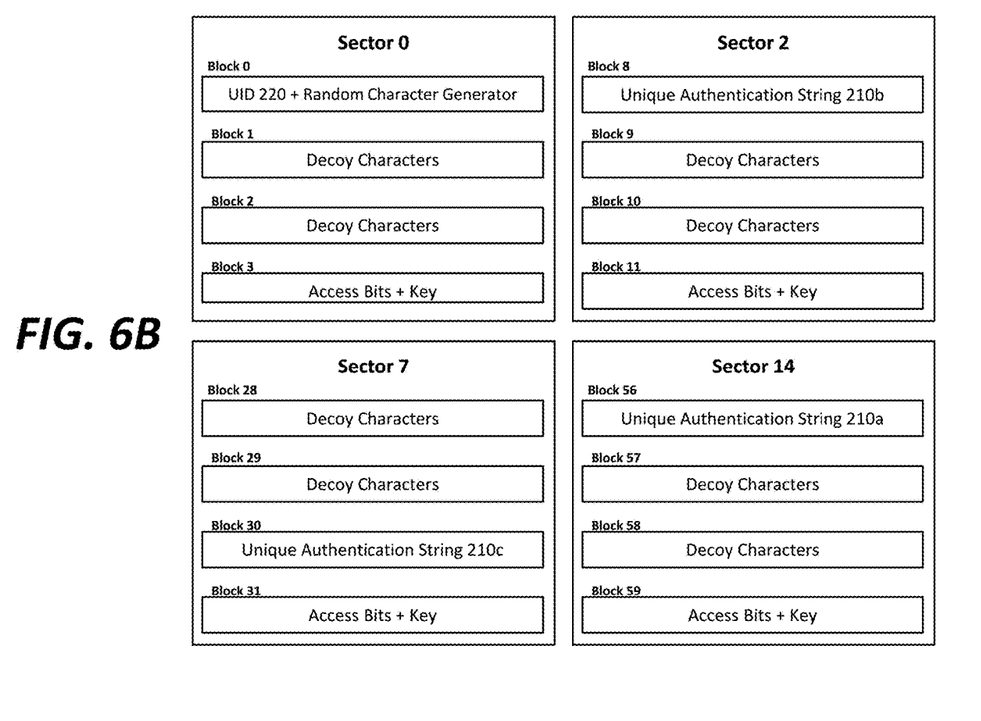
FIG. 6B schematically depicts a representative approach for storing the portions of the UAS in different blocks of the various sectors of the data storage medium of FIG. 5, according to an embodiment of the present disclosure.

FIGS. 6A and 6B depict a representative approach for storing UAS 210 on the data storage medium 15 of FIG. 5. Recall from steps 1-5 in the above example that the unique identifier 220 of the RFID tag was manipulated to form three unique authentication strings 210a, 210b, 210c. In various embodiments of the present disclosure, these UAS 210a, 210b, 210c may be stored in separate locations on data storage medium 15.

For example, in various embodiments, UAS 210a, 210b, 210c may be stored in different sectors of data storage medium 15 as shown by the hash pattern in FIG. 6A and in the text of FIG. 6B. In this example, UAS 210a is stored in Sector 14, UAS 210b is stored in Sector 2, and UAS 210c is stored in Sector 7. In one aspect, this may be necessary if UASs 210a, 210b, 210c exceed the storage capacity of a given partition of data storage medium 15. Yet, in another aspect, one of ordinary skill in the art will recognize that splitting up UAS 210 and storing pieces of it in different locations on data storage medium 15 may make it more challenging for an unauthorized party to identify UAS 210, thereby making it more difficult for said party to reverse engineer the particular process used to generate UAS 210 from UID 220. This, in turn, can make it more difficult for unauthorized third parties to produce and sell unauthentic cartridges, or to develop countermeasures for overcoming the authentication process such that unauthentic cartridges may be used in water filtration system 100.

Further to that end, UAS 210a, 210b, 210c may be stored in different blocks of the selected sectors in an effort to further hide the identity of UAS 210. For example, whereas UAS 210a and 210b are stored in the first blocks of their respective sectors (i.e., UAS 210a in block 56 of sector 14, and UAS 210b in block 8 of sector 2), UAS 210c is instead stored in the third block of its respective sector (i.e., UAS 210c in block 30 of sector 7).

Still further, in various embodiments, the remaining portions of data storage medium 15 may be populated with random or otherwise irrelevant characters (referred to herein as "decoy characters") to further hide the identity of UAS 210. This may increase the difficulty and computing power necessary to identify UAS 210 amongst other data stored on data storage medium 15. In such embodiments, some or all of those blocks in FIG. 6B not otherwise populated with UID 220, UAS 210, or other purposeful information may instead include decoy characters (i.e., blocks 1, 2, 9, 10, 28, 29, 57, 58). This may be the case as to some or all of any other empty blocks in the remaining sectors of data storage medium 15. Further, decoy characters may be stored in the same block(s) as UID 220 and UAS 210, space permitting, such that those blocks containing UID 220 and/or UAS 210 do not stand out as having a disparate number of characters relative to other blocks of data storage medium 15.

To that end, data storage medium 15 may be provided with a random character generator configured to fill in otherwise unused blocks with decoy characters. The random number generator, in an embodiment, may be configured to generate characters randomly and populate them throughout unused blocks. In another embodiment, the random character generator may instead be configured to generate HEX strings based on UID 220 such that the resulting decoy characters appear similar to UAS 210, thereby making it even more difficult identify UAS 210 amongst the decoys. As shown in FIG. 6, the random character generator may be stored in the same block as UID 220 (e.g., in block 0 of sector 0), or in any other suitable location on data storage medium 15.

Processor 160 may be configured to later parse UID 220 and/or UAS 210 from amongst the decoy characters on data storage medium 15 during the authentication process according to instructions stored in memory 170. As later described in more detail, the expected location(s) and length(s) of UAS 210 and/or UID 220 on data storage medium 15 may be specified and stored on memory 170 such that processor 160 can locate these items without needing any information about how the decoy characters were generated and placed thereon. As configured, it is not necessary to store instructions regarding the decoy generation and placement processes on memory 170. This, in turn, gives the manufacturer, distributor, or other authorized party to make improvements on the front end to the decoy character generation and placement processes without affecting or needing to update the authentication process used by authentication system 200 on the backend, thereby obviating the need to push or otherwise distribute software updates to equipment in the field.

The above-referenced processes for storing UAS 210 may be performed using any suitable hardware and software programs known in the art. For example, any suitable commercial RFID reader/writer may be used to locate the appropriate area(s) in which to store UAS 210 or portions thereof, and to write UAS 210 onto data storage medium 15.

Authenticating Cartridge 200

Figure 7:
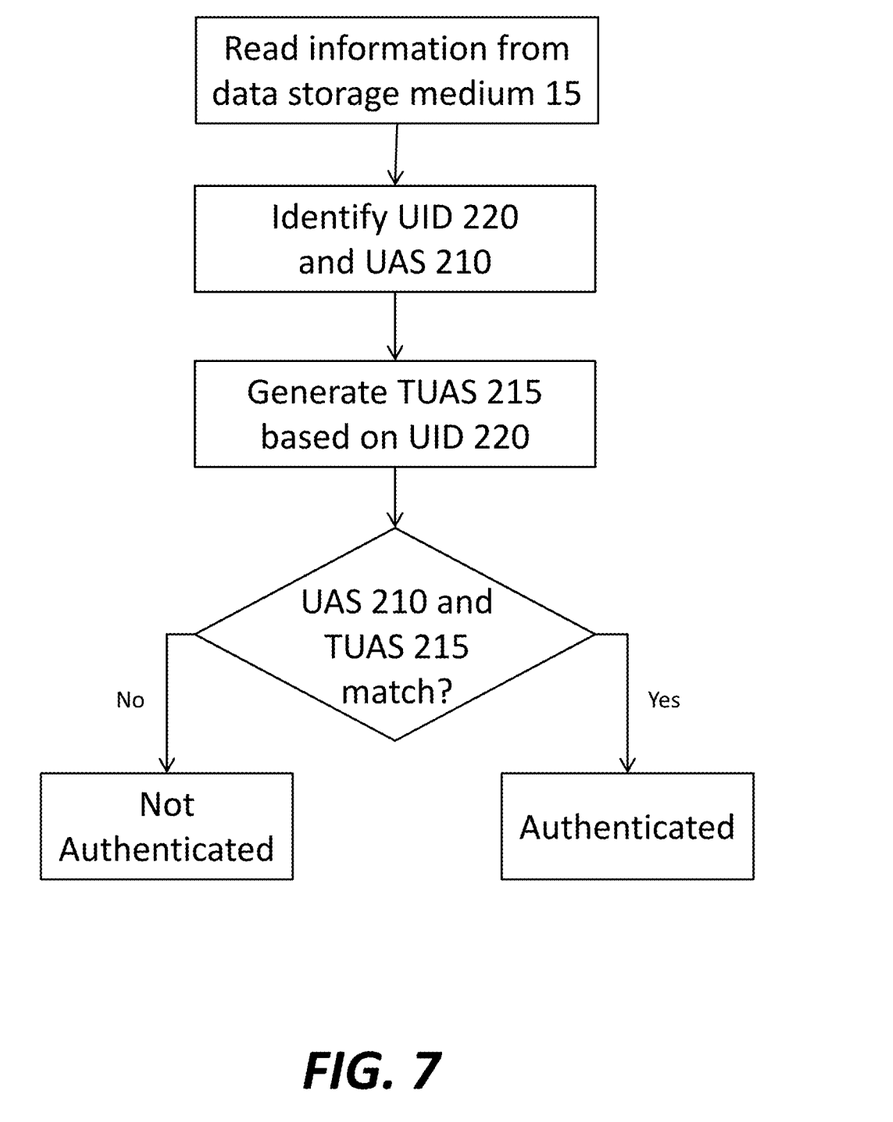
FIG. 7 is a flow chart depicting a representative process for using UAS to authenticate the cartridge, according to an embodiment of the present disclosure.

FIG. 7 illustrates a representative process for using UAS 210 to authenticate cartridge 10. This process, in various embodiments, may be performed upon insertion or attempted use of cartridge 10 in water filtration system 100. In this way, cartridge 10 can be authenticated at the end user stage prior to use in water filtration system 100.

As previously described, authentication system 200 of the present disclosure may comprise reader 150, processor 160 and memory 170 of water filtration system 100. Processor 160 may operate according to instructions stored on memory 170 to first instruct reader 150 in reading information from data storage medium 15. In an embodiment, processor 160 may instruct reader 150 to read all information stored on data storage medium 15, while in another embodiment, processor 160 may instruct reader 150 to selectively read only certain information on data storage medium 15. In either approach, the aim is to retrieve information that allows authentication system 200 to identify UID 220 and UAS 210 as stored on data storage medium 15 of cartridge 10.

To the end of locating and identifying UID 220, authentication system 200, in various embodiments, may be pre-programmed with the anticipated location of UID 220 on data storage medium 15, and/or with knowledge sufficient for determining same. For example, authentication system 200 may be configured to access and read information stored in a particular location of data storage medium 210 in which UID 220 is typically located to identify UID 220, such as block 0 of sector 0 as in the example of FIGS. 5 and 6A-6B. In another example, authentication system may additionally or alternatively parse information read from data storage medium 15 for some sort of indicator typically associated with UID 220, such as a particular sequence of characters included to convey that UID 220 follows and is of a certain string length. These instructions may be stored on memory 170 and, in an embodiment, be encrypted, obfuscated, or otherwise processed to deter reverse engineering by unauthorized parties.

To the end of locating and identifying UAS 210, authentication system 200, in various embodiments, may be pre-programmed with knowledge of the methodology used to generate UAS 210 based on UID 220. For example, authentication system may be programmed with instructions for accessing and reading information stored in those particular locations in which UAS 210 was previously stored before being distributed for use in water filtration system 100, such as blocks 8, 30, and 56 of sectors 2, 7, and 14, respectively. Additionally or alternatively, authentication system may be configured to parse information read from data storage medium 15 for some sort of indicator designed, such as a particular sequence of characters, designed to convey the locations and lengths of UAS 210 or portions 210a, 210b, 210c thereof. These instructions may be stored on memory 170 and, in an embodiment, be encrypted, obfuscated, or otherwise processed to deter reverse engineering by unauthorized parties.

Upon locating and identifying UID 220 and UAS 210, authentication system 200 may be configured to generate a test unique authentication string (TUAS) 215 based on UID 220. Here, the aim is to apply the same methodology used for generating UAS 210 from UID 220 to determine whether the resulting string (TUAS 215) matches UAS 210. To that end, authentication system 200 may be preprogrammed with the same instructions (or with similar instructions designed to effect the same methodology) used to generate UAS 210, as described in previous sections relating to generating UAS 210. For example, memory 170 of authentication system 200 may be configured with instructions for directing processor 160 in performing steps 1-5 described above on the stored UID 220 to generate TUAS 215. These instructions may be stored on memory 170 and, in an embodiment, be encrypted, obfuscated, or otherwise processed to deter reverse engineering by unauthorized parties.

Upon generating TUAS 215, authentication system may then compare UAS 210 with TUAS 215 to determine if they match. If they match, authentication system 200 considers UAS 210 as having been generated and stored according to an authorized methodology and deems the cartridge 10 authenticated. If they do not match, authentication system 200 considers UAS 210 as having been generated and stored according to an unauthorized methodology and deems the cartridge 10 as not authenticated, as shown in FIG. 7.

Alternatively (not shown), authentication system 200 may be configured with reverse instructions to instead generate a test unique identifier (TUID) 225 from the UAS 210 on cartridge 10, and then compare TUID 225 to UID 220 read from cartridge 10 to determine whether cartridge 10 is authentic.

Local and Remote Authentication

Systems and methods of the present disclosure may be configured to provide for local and/or remote authentication of cartridge 10, as further described below.

The present disclosure provides for local authentication in embodiments in which UAS 210 and UID 220 are both stored on cartridge 10, and in which instructions for generating TUAS 215 are stored in authentication system 200 (e.g., in memory 170). As configured, all necessary information for authenticating cartridge 10 is available at water filtration system 100 and thus it is not necessary to retrieve or receive information from a remote source (e.g., remote server or database) to perform the authentication process described herein. The ability to perform local authentication can reduce the cost and complexity of the overall system, and obviate the need for including hardware and functionality necessary for connecting to the internet, phone networks, or the like for communication with a remote database or server. Further, systems relying on local authentication alone avoid the need for making and maintaining a remote database or server for storing information and/or instructions necessary for the authentication process.

Authentication system 200, in various embodiments, may be modified to provide for remote authentication via the inclusion of a communications link with a remote database or server. In such embodiments, authentication system 200 may be configured to transmit UID 220 and UAS 210 to a remote server containing instructions for generating TUAS 215 (or TUID 225). In an embodiment, the remote server may compare TUAS 215 with UAS 210 (or TUID 225 with UID 220) and, in turn, respond to water filtration system 100 as to whether cartridge 10 is authenticated. In another embodiment, the remote server may instead transmit TUAS 215 (or TUID 225) to water filtration system 100, wherein processor 160 then makes the aforementioned comparison to determine if cartridge 10 is authenticated.

Regardless of whether authentication system 200 is configured for local or remote authentication, in various embodiments, authentication system 200 may be configured to take measures to prevent a spent cartridge 10 from being replenished by an unauthorized party and subsequently resold for future use. In one such embodiment, authentication system 200 may be configured to erase UAS 210 from data storage medium 15 or otherwise manipulate it or its location on data storage medium 15. In doing so, an unauthorized party could not reprogram data storage medium 15 with the proper UAS 210 without knowing the proprietary methodology used to initially generate and store UAS 210 on that cartridge.

While the presently disclosed embodiments have been described with reference to certain embodiments thereof, it should be understood by those skilled in the art that various changes may be made and equivalents may be substituted without departing from the true spirit and scope of the presently disclosed embodiments. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

What is claimed is:

1. A system for use in a water filtration system to authenticate a cartridge, the system comprising:
   a reader included in a water filtration system and configured to read a unique identifier (UID) and a unique authentication string (UAS) stored on a data storage medium associated with a cartridge containing water filtration media;
   a memory included in the water filtration system and containing computer-readable instructions for generating, based on the UID or the UAS read from the data storage medium, a test unique authentication string (TUAS) or a test unique identifier (TUID), respectively, according to a methodology used to generate the UAS stored on the data storage medium; and
   a processor included in the water filtration system and configured to:
      read the computer-readable instructions from the memory,
      generate the TUAS or the TUID according to the instructions, and
      compare the TUAS or the TUID to the UAS or the UID read from the data storage medium, respectively, to determine if the cartridge is authentic,
      wherein decoy characters are stored throughout otherwise unused portions of the data storage medium.

2. The system of claim 1, wherein the reader is an RFID reader and the data storage medium is an RFID tag.

3. The system of claim 1, wherein the UID is a unique string of characters assigned to and stored on the data storage medium for differentiating the identity of the cartridge from that of other cartridges.

4. The system of claim 1, wherein the UAS is a string of characters associated with the UID and representative of one or more manipulations of characters forming the UID.

5. The system of claim 4, wherein portions of the string of characters are stored separately in predefined locations on the digital storage medium associated with the cartridge.

6. The system of claim 1, wherein the methodology for generating the TUAS or the TUID comprises one or a combination of rearranging, altering, dividing, supplementing, or otherwise manipulating the characters forming the UID or the UAS, respectively.

7. The system of claim 1, wherein the processor determines that the cartridge is authentic if the TUAS or the TUID matches the UAS or the UID, respectively.

8. A method for authenticating a cartridge installed in a water filtration system, the method comprising:
   reading a unique identifier (UID) and a unique authentication string (UAS) stored on a data storage medium associated with a cartridge installed in a water filtration system, the cartridge containing water filtration media;
   generating, based on the UID or the UAS read from the data storage medium, a test unique authentication string (TUAS) or a test unique identifier (TUID), respectively, according to a methodology used to generate the UAS stored on the data storage medium; and comparing the TUAS or the TUID to the UAS or the UID read from the data storage medium, respectively, to determine if the cartridge installed in the water filtration system is authentic, wherein decoy characters are stored throughout otherwise unused portions of the data storage medium.

9. The method of claim 8, wherein the data storage medium is an RFID tag, and wherein the step of reading is performed by an RFID reader.

10. The method of claim 8, wherein the UID is a unique string of characters assigned to and stored on the data storage medium for differentiating the identity of the cartridge from that of other cartridges.

11. The method of claim 8, wherein the UAS is one or more strings of characters associated with the UID and representative of one or more manipulations of characters forming the UID.

12. The method of claim 8, wherein the methodology for generating the TUAS or the TUID comprises one or a combination of rearranging, altering, dividing, supplementing, or otherwise manipulating the characters forming the UID or the UAS, respectively.

13. The method of claim 11, wherein the UAS comprises at least two strings of characters, and wherein each of the strings of characters are stored in separate locations on the digital storage medium associated with the cartridge.

14. The method of claim 8, wherein the step of comparing includes:

determining that the cartridge is authentic if the TUAS or the TUID matches the UAS or the UID, respectively.

* * * * *